No. 740,073. Patented September 29, 1903.

UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 740,073, dated September 29, 1903.

Application filed November 22, 1902. Serial No. 132,426. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments; and it consists in the novel series of steps more fully set forth in the specification and pointed out in the claims.

Broadly stated, the process contemplates the precipitation of barium carbonate and zinc sulfid from solutions of barium sulfid, the carbonate of an alkali metal, and a salt of zinc.

As a general illustration of my process the following may be cited: Solutions of barium sulfid, sodium carbonate, and zinc sulfate are prepared. The solutions of barium sulfid and sodium carbonate are mixed together, when barium carbonate is precipitated and sodium sulfid formed in solution. To the latter is added the zinc sulfate, when zinc sulfid is precipitated and sodium sulfate formed in solution. The latter solution is separated from the precipitates, the precipitates first mixed, washed, and then drained and dried, the superfluous water being separated in a suitable manner, such as by filter-pressing. The equation in illustration of the reactions being as follows:

$$BaS + Na_2CO_3 = BaCO_3 + Na_2S.$$

$$Na_2S + ZnSO_4 = ZnS + Na_2SO_4.$$

Obviously zinc nitrate, or other soluble salt of zinc, such as chlorid or acetate, can be substituted for the zinc-sulfate solution without departing from the principle of the process. Also potassium or ammonium carbonate can be readily substituted for the sodium carbonate.

The order of addition of the respective solutions can be varied, of which the following is an example:

$$Zn(NO_3)_2 + BaS = ZnS + Ba(NO_3)_2.$$

$$Ba(NO_3)_2 + Na_2CO_3 = BaCO_3 + 2NaNO_3.$$

When the solutions are brought together, as in the immediate preceding equation, zinc sulfate is not used as the zinc-salt solution, as in that event the barium would be precipitated as the sulfate, and this is to be avoided. It will also be apparent that the solutions can be brought together either successively or simultaneously (if zinc in the form of sulfate is not used) when the barium carbonate and zinc sulfid will be precipitated rapidly one upon the other or formed practically simultaneously, according to the following equation:

$$BaS + Na_2CO_3 + Zn(NO_3)_2 =$$
$$BaCO_3 + ZnS + 2NaNO_3.$$

While zinc chlorid is a full equivalent for the other salts of zinc, yet the final solution formed when it is used is a chlorid of an alkali metal, which is not so valuable as when the sulfate, nitrate, or acetate of an alkali metal is formed in final solution.

The reactions occurring when one or the other alkali carbonates is substituted for the sodium carbonate will be readily apparent.

As a commercial illustration of the process the following is cited: Separate aqueous solutions of the following are prepared in the proportions specified: barium sulfid, one hundred and sixty-nine (169) pounds; sodium carbonate, one hundred and six (106) pounds; zinc sulfate, one hundred and sixty-one (161) pounds. The barium-sulfid and sodium-carbonate solutions are mixed together, when there is formed a precipitate of one hundred and ninety-seven (197) pounds of barium carbonate and seventy-eight (78) pounds of sodium sulfid in solution. The zinc sulfate solution is now added, which, reacting with the sodium-sulfid solution, forms a precipitate of ninety-seven (97) pounds of zinc sulfid, with one hundred and forty-two (142) pounds of sodium sulfate remaining in solution.

A second illustration of the process in actual practice is as follows: Separate aqueous solutions of the following are prepared in the proportions specified: zinc nitrate, one hundred and eighty-nine (189) pounds; barium sulfid, one hundred and sixty-nine (169) pounds; sodium carbonate, one hundred and six (106) pounds. The zinc-nitrate and barium-sulfid solutions are mixed together, when ninety-seven (97) pounds of zinc sulfid is precipitated and two hundred and sixty-one (261) pounds of barium nitrate formed in solution. The sodium-carbonate solution is now added, and, reacting with the barium-nitrate solution, one hundred and ninety-seven (197) pounds of barium carbonate is precipitated and one hundred and seventy (170) pounds of nitrate of soda formed in solution.

The weights given are for anhydrous salts. For hydrous salts the weights should be increased accordingly.

The final solution remaining after draining from the precipitates can be evaporated to a crystalline condition and the substance thereby recovered in a merchantable form. The recovered precipitates are treated as previously indicated.

I may of course invoke the doctrine of chemical equivalents wherever the same may apply.

Having described my invention, what I claim is—

1. The process of making pigment composed of zinc sulfid and barium carbonate, which consists in bringing together solutions of barium sulfid, the carbonate of an alkali metal, and a suitable salt of zinc, and recovering the resulting precipitates, substantially as set forth.

2. The process of making pigment composed of zinc sulfid and barium carbonate, which consists in bringing together solutions of barium sulfid, sodium carbonate, and a suitable salt of zinc, and recovering the resulting precipitates, substantially as set forth.

3. The process of making pigment composed of zinc sulfid and barium carbonate, which consists in bringing together solutions of barium sulfid, the carbonate of an alkali metal, and zinc sulfate, and recovering the resulting precipitates, substantially as set forth.

4. The process of making pigment composed of zinc sulfid and barium carbonate, which consists in bringing together solutions of barium sulfid, sodium carbonate, and zinc sulfate, and recovering the resulting precipitates, substantially as set forth.

5. The process of making pigment which consists in mixing a solution of barium sulfid with the carbonate of an alkali metal thereby first precipitating the carbonate of barium, then adding a salt of zinc, and recovering the precipitates, substantially as set forth.

6. The process of making pigment which consists in mixing a solution of barium sulfid with sodium carbonate thereby first precipitating the carbonate of barium, then adding a salt of zinc and recovering the precipitates, substantially as set forth.

7. The process of making pigment which consists in mixing a solution of barium sulfid with the carbonate of an alkali metal thereby first precipitating the carbonate of barium, then adding sulfate of zinc, and recovering the precipitates, substantially as set forth.

In testimony whereof I affix my signature in presence of two witnesses.

WILLIAM J. ARMBRUSTER.

Witnesses:
EMIL STAREK,
G. L. BELFRY.